US 7,567,664 B2

(12) United States Patent
Hoffman

(10) Patent No.: US 7,567,664 B2
(45) Date of Patent: Jul. 28, 2009

(54) METHOD AND APPARATUS FOR PROVIDING ACCESSIBILITY FEATURES FOR A TELEPHONE

(75) Inventor: Frank Hoffman, Mount Laurel, NJ (US)

(73) Assignee: General Instrument Corporation, Horsham, PA (US)

( * ) Notice: Subject to any disclaimer, the term of this patent is extended or adjusted under 35 U.S.C. 154(b) by 784 days.

(21) Appl. No.: 11/294,032

(22) Filed: Dec. 5, 2005

(65) Prior Publication Data

US 2007/0127673 A1 Jun. 7, 2007

(51) Int. Cl.
*H04M 1/00* (2006.01)
(52) U.S. Cl. ...................................... 379/377
(58) Field of Classification Search ................ 379/377
See application file for complete search history.

(56) References Cited

U.S. PATENT DOCUMENTS

| 3,201,521 | A | * | 8/1965 | Mayer et al. | ................ 379/67.1 |
| 4,009,337 | A | * | 2/1977 | Sakai et al. | ................. 379/122 |
| 4,086,444 | A | * | 4/1978 | Smith et al. | ................. 379/159 |
| 4,993,059 | A | * | 2/1991 | Smith et al. | .................... 379/39 |
| 5,764,752 | A | * | 6/1998 | Waite et al. | ................ 379/377 |

* cited by examiner

*Primary Examiner*—Creighton Smith
(74) *Attorney, Agent, or Firm*—Larry T. Cullen

(57) ABSTRACT

Method and apparatus for providing accessibility features for a telephone is described. In one example, a telephone system includes a memory, a counter, and a microcontroller. The memory is configured to store user preference data, including duration of a timeout period. The microcontroller is configured to initialize the counter in response to an off-hook condition and, if a value of the counter equals the duration of the timeout period before detection of an on-hook condition, transition to the on-hook condition.

29 Claims, 2 Drawing Sheets

METHOD AND APPARATUS FOR PROVIDING ACCESSIBILITY FEATURES FOR A TELEPHONE

BACKGROUND OF THE INVENTION

1. Field of the Invention

The present invention relates to telephone devices and, more particularly, to a method and apparatus for providing accessibility features for a telephone.

2. Description of the Background Art

Present telephone systems, such as cordless telephones, may be difficult to operate for some segments of the population, such as senior citizens or children. For example, a user may not properly hang up a cordless handset after use (i.e., place the cordless handset on-hook). In some cases, this is due to the size and/or arrangement of buttons on the cordless handset, in particular, the on/off hook button. Conventionally, if a cordless handset will remain in an off-hook condition until manually placed into the on-hook condition or the battery is depleted. In some cases, it may take 6 or more hours for a cordless handset to deplete its battery. While the handset is in the off-hook condition, the telephone line is not accessible and incoming calls cannot be received. As such, the user cannot be reached via the telephone. Accordingly, there exists a need in the art for a method and apparatus for providing accessibility features for a telephone that render the telephone more user-friendly.

SUMMARY OF THE INVENTION

Method and apparatus for providing accessibility features for a telephone is described. In one embodiment, a telephone system includes a memory, a counter, and a microcontroller. The memory is configured to store user preference data, including duration of a timeout period. The microcontroller is configured to initialize the counter in response to an off-hook condition and, if a value of the counter equals the duration of the timeout period before detection of an on-hook condition, transition to the on-hook condition.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

Figure 1:
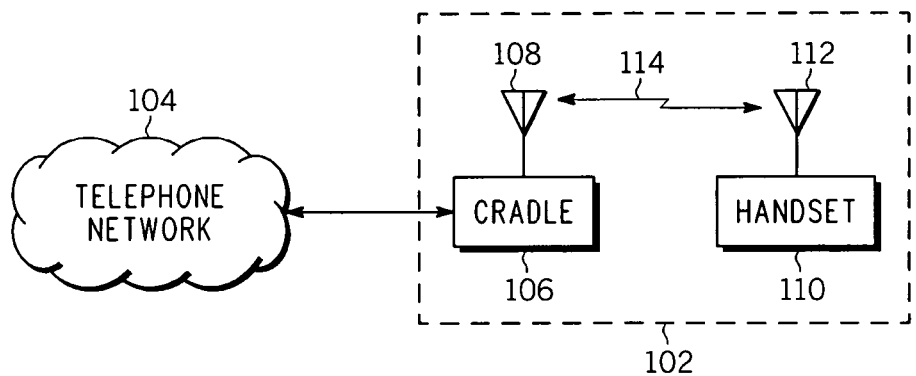
FIG. 1 is a block diagram depicting an exemplary embodiment of telephone system coupled to a telephone network.

FIG. 1 is a block diagram depicting an exemplary embodiment of telephone system 102 coupled to a telephone network 104. The telephone network 104 may be a circuit-switched network, such as a publicly switched telephone network (PSTN), or a packet-switched network, such as a voice-over internet protocol (VOIP) network. The telephone system 102 includes a cradle 106 and a handset 110. The cradle 106 is coupled to the telephone network 104 and includes an antenna 108. The handset 110 includes an antenna 112. The handset is configured for communication with the telephone network 104 via a wireless link 114 between the antenna 108 and the antenna 112. For example, the telephone system 102 may comprise a cordless telephone system. Typically, the handset 110 is battery powered via a rechargeable battery. The handset 110 is typically placed in the cradle 106 to charge the battery. In accordance with the invention, the telephone system 102 includes various accessibility features to increase usability of the telephone system 102, as described below. Notably, the various accessibility features discussed below may be desirable for senior citizen or child users of the telephone system 102.

Figure 2:
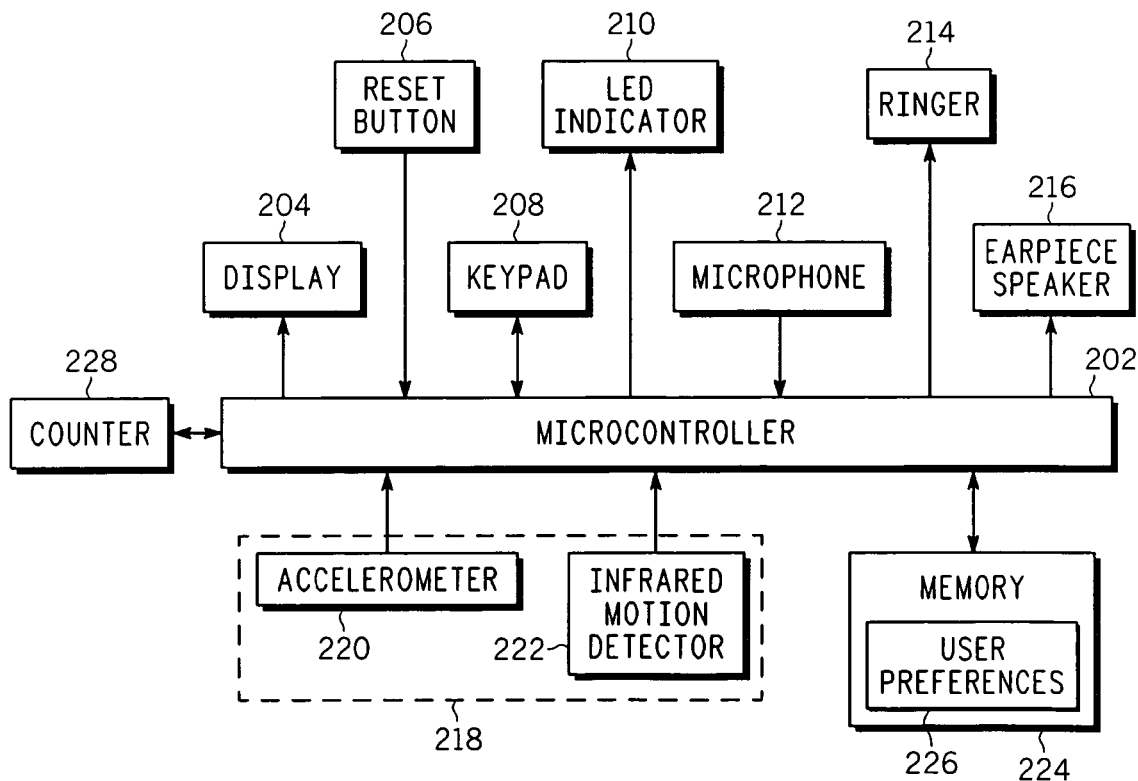
FIG. 2 is a block diagram depicting an exemplary embodiment of the telephone system in accordance with one or more aspects of the invention.

FIG. 2 is a block diagram depicting an exemplary embodiment of the telephone system 102 in accordance with one or more aspects of the invention. In one embodiment, the elements shown in FIG. 2 are located in the handset 110. In one embodiment, the telephone system 102 includes a microcontroller 202, a memory 224, a display 204, a keypad 208, a microphone 212, a ringer 214, and an earpiece speaker 216. Each of the memory 224, the display 204, the keypad 208, the microphone 212, the ringer 214, and the earpiece speaker 216 is coupled to the microcontroller 202. The memory 224 may comprise a non-volatile memory, such as a FLASH memory. The memory 224 stores user preferences 226, as discussed below. The display 204 may comprise a liquid crystal display (LCD) having a backlight. The keypad 208 includes various types of keys, including standard number and symbol keys for a telephone (i.e., numbers 0-9, star (*), and pound sign (#)), as well as other types of keys for controlling the telephone system 102, such as an on/off hook key, a flash key, and the like.

In one embodiment, the telephone system 102 is configured with a programmable timeout feature that provides an automatic disconnect from the phone line (referred to as the "line saver feature"). The automatic disconnect is the equivalent of hanging up the phone (i.e., causing the phone to transition from an off-hook state to an on-hook state). The user preferences 226 include a timeout period. The duration of the timeout period is programmable. For example, the timeout period may be selected from a range between 10 minutes and 120 minutes, although other ranges may be used. The microcontroller 202 is configured to initialize a counter 228 in response to detection of the off-hook condition. The counter 228 begins counting towards expiration of the timeout period.

When the value of the counter 228 reaches a predefined percentage of the timeout period, the microcontroller 202 triggers an audible and/or visual indication ("timeout warning"). The predefined percentage may be programmable and included as part of the user preferences 226. For example, the predefined percentage may be 10% of the timeout period, although other percentages may be used. The audible indication may be emitted by the earpiece speaker 216. For example, the microcontroller 202 may cause the earpiece speaker 216 to emit a characteristic 800 Hz beep-beep tone at a cadence of two 200 millisecond beeps spaced 100 milliseconds with a six second pause between beep cycles. It is to be understood that other values may be used for the beep-beep tone and that other types of tones or audible indications may be used. The visual indication may comprise a flashing key of the key pad 208 and/or a text message on the display 204. For example, the microcontroller 202 may cause a predefined key on the keypad to flash at a predefined frequency (e.g., the pound (#) key). The microcontroller 202 may further cause the display 204 to show a message.

In one embodiment, the timeout period is configured to be extended in response to an entry on the keypad 208. For example, when the value of the counter 228 reaches the predefined percentage of the timeout period, the timeout warning may include flashing a predefined key (e.g., the pound (#) key), as described above. The microcontroller 202 may extend the timeout period temporality in response to the user pressing the flashing key on the keypad 208. The microcontroller 202 may cause the display 204 to show a message indicating that the timeout period can be extended by pressing the appropriate key on the keypad 208 (e.g., "press # key to extend timeout").

In one embodiment, as an alternative to the timeout warnings discussed above or in addition to such warnings, the microcontroller 202 may activate the ringer 214 to emit a predefined ring tone. The ring tone should be distinguishable from the normal ring tone that signals an incoming call. For example, a ringer sequence such as a 1000 Hz interrupted at a 10 Hz rate with a period of two seconds on and two seconds of silence may be used, although other ring tones may be used having other parameters. The number or rings may be programmable and included as part of the user preferences 226. For example, the number of rings may range from 4 to 20 rings, although other ranges may be used.

In one embodiment, as an alternative to the timeout warnings discussed above or in addition to such warnings, the microcontroller 202 may activate a light emitting diode (LED) indicator 210. The LED indicator 210 may be a dedicated LED associated with the timeout warning (e.g., the LED may be labeled "hang up phone" or "place phone in cradle").

In any case, the microcontroller 202 may deactivate the timeout warnings discussed above or any combination of such timeout warnings in response to either an extension of the timeout period or by detecting an on-hook condition. When the value of the counter 228 indicates expiration of the timeout period, the microcontroller 202 causes the transition from the off-hook state to the on-hook state. In one embodiment, the timeout warnings or any combination thereof may be temporally suspended if it is detected that the telephone system 102 is in use. For example, the telephone system 102 may include motion detection logic 218 having an accelerometer 220. The accelerometer 220 is configured to provide a signal to the microcontroller 202 indicative of whether the handset 110 is in motion. If the accelerometer 220 indicates that the handset 110 is in motion, the microcontroller 202 may temporally suspend the timeout feature such that the timeout warnings are not issued (e.g., the counter 228 is paused). When the accelerometer 220 indicates that handset 110 is not in motion for a predefined period of time, the microcontroller 202 resumes the timeout feature (e.g., the counter 228 is restarted and/or reinitialized). As an alternative to or in addition to detecting motion, the microcontroller 202 may suspend the timeout feature in response to detection of audio activity via the microphone 212 having a level above the background noise level. The microcontroller 202 resumes the timeout feature when the level of the audio activity detected by the microphone 212 falls below the background noise level. Thus, the timeout feature may be suspended if either motion is detected or audio activity above a background level is detected, or the timeout feature may be suspended if both motion is detected and audio activity above the background level is detected.

In another embodiment, rather than causing the timeout warnings or any combination of such timeout warnings in response to the counter 228 reaching the predefined percentage of the timeout period, the timeout warning(s) may be issued if the microcontroller 202 detects that the phone is not in motion and/or there is no audio activity above the background noise level after a predefined percentage of the timeout period.

In one embodiment, the timeout feature of the telephone system 102 may be password-PIN protected. That is, the various settings of the user preferences 226 may be protected from being changed by a PIN. In addition, the various settings of the user preferences 226 may have default values (e.g., a default timeout period of 60 minutes, a default predefined percentage of 10%, a default number of warning beeps and/or rings, etc.). The telephone system 102 may include a reset button 206 for resetting one or more of the programmed settings to the default setting. For example, the reset button 206 may be a recessed push button, a small hole that a paperclip, pencil, or pen tip can be inserted, a particular sequence of key presses on the key pad 208, or the like.

In one embodiment of the invention, the telephone system 102 is configured with a feature for lighting the keypad 208 and/or display 204 in response to detection of motion in the environment around the telephone system 102. For example, the motion detection logic 218 may include a passive infrared (PIR) motion detector 222. The PIR motion detector 222 is configured to provide a signal to the microcontroller 202 indicative of motion in the environment. For example, the PIR motion detector 222 may detect motion of an average size person about 20 to 30 feet away. Upon detection of motion in the environment, the microcontroller 202 causes the LED key pad 208 and/or display 204 to be activated for a predefined time period (e.g., 30 seconds). The microcontroller 202 may cause the LED key pad 208 and/or the display 204 to be deactivated (e.g., via a fade) if no additional motion is detected before the end of the predefined period. If the PIR motion detector 222 detects continuous motion, the microcontroller 202 may cause the LED key pad 208 and/or display 204 to be activated for a longer period (e.g., 5 minutes). In any case, the predefined periods may have default values and may be programmable and stored as part of the user preferences 226. The present feature may be operable while the handset 110 is in the cradle 106 or away from the cradle 106 in an on-hook condition. In one embodiment, the microcontroller 202 may cause the LED key pad 208 and/or display 204 to be deactivated before expiration of the predefined time period if the accelerometer 220 detects motion of the handset 110.

The telephone system 102 may be configured with several additional accessibility features in addition to those described above. For example, the LED key pad 208 may flash in cadence with a received call's ring signal via the ringer 214. The numeric keys on the key pad 208 may comprise larger, back lighted push buttons. The display 204 may be easy to read in low light and have a large text font. The LED key pad 208 may change color to distinguish between an incoming ring signal (e.g., yellow) and an off hook/motion detected condition (e.g., blue).

Notably, some of the elements in FIG. 2 may be omitted, depending on the particular embodiments described above. For example, if the telephone system 102 is not configured to detect motion of the handset 110, then the telephone system 102 need not include the accelerometer 220. In another example, the telephone system 102 does not include the display 204.

Figure 3:
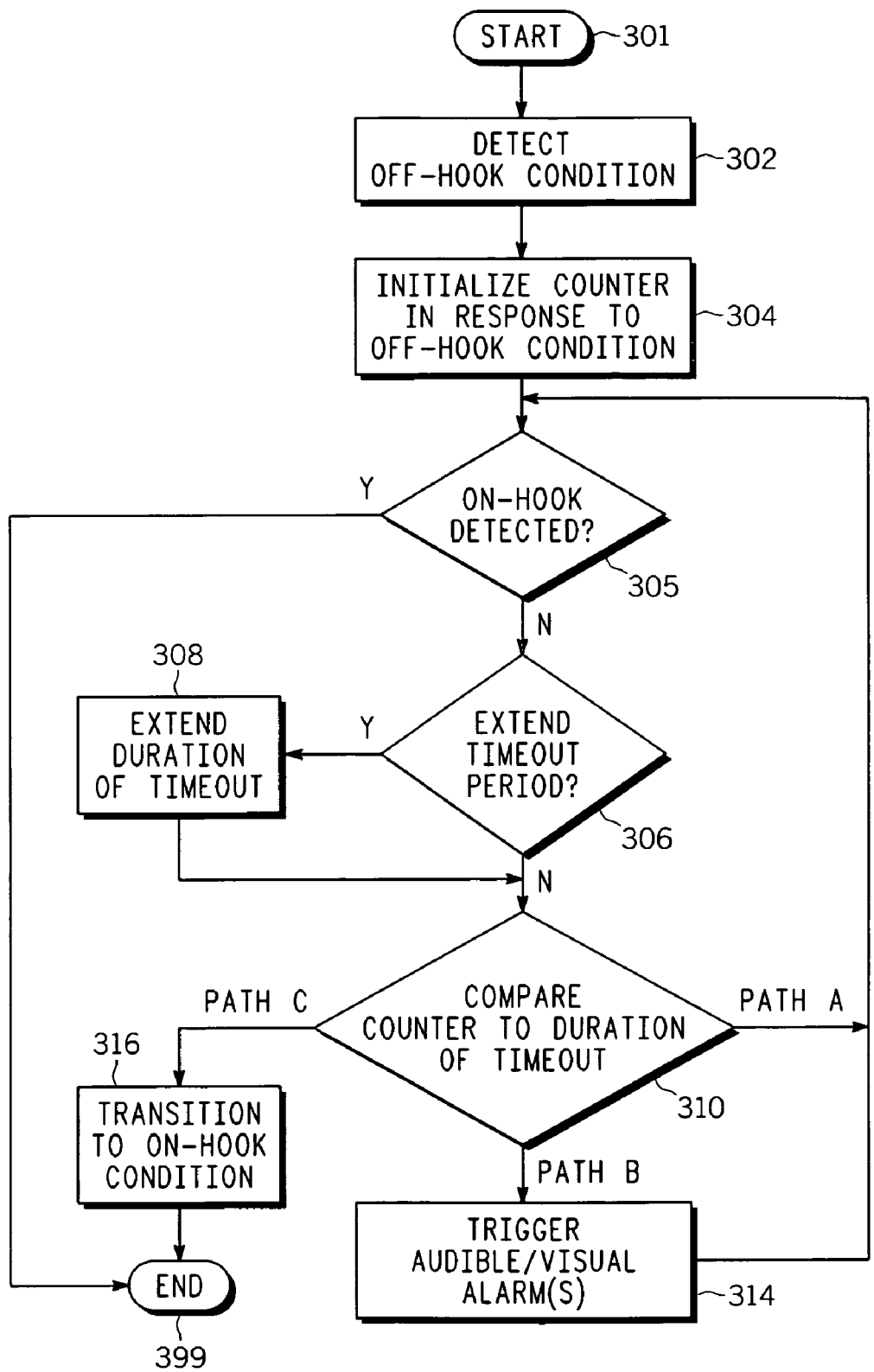
FIG. 3 is a flow diagram depicting an exemplary embodiment of a method in accordance with one or more aspects of the invention.

FIG. 3 is a flow diagram depicting an exemplary embodiment of a method 300 in accordance with one or more aspects of the invention. The method 300 is performed by the microcontroller 202 in the telephone system 102. The method 300 begins at step 301. At step 302, an off-hook condition is detected. At step 304, a counter is initialized in response to the off-hook condition. At step 305, a determination is made whether an on-hook condition is detected. If so, the method 300 ends at step 399. Otherwise, the method proceeds to step 306. At step 306, a determination is made whether the timeout period should be extended. Notably, an "extension" of the timeout period may be affected by either increasing the duration of the timeout period or pausing the counter. In one embodiment, the timeout period is extended in response to a determination that the telephone system 102 is in active use. Motion of the handset and/or detection of audio above a background level may be used to indicate active use. In another embodiment, the timeout period is extended in response to a command. For example, the user may have pressed the predefined key associated with extending the duration of the timeout period.

If, at step 306, the timeout period is to be extended, the method 300 proceeds to step 308, where the duration of the timeout period is extended. The extension may be fixed until an on-hook condition is detected. Alternatively, the extension may be temporary such that the duration of the timeout period subsequently returns to the initial value. For example, the timeout period may be extended only so long as the telephone system 102 is in active use. If the telephone system 102 is not in active use for a predefined period of time, the extension of the timeout period may expire (i.e., a paused counter may be resumed or the duration set to the initial value). The method 300 proceeds to step 310. If, at step 306, the timeout period is not to be extended, the method 300 proceeds to step 310.

At step 310, a value of the counter is compared with the duration of a timeout period. If the value of the counter is not within a predefined percentage of the duration of the timeout period, the method 300 returns to step 305 via PATH A. If the value of the counter is within the predefined percentage of the duration of the timeout period, but does not equal the duration of the timeout period, the method 300 proceeds to step 312 via PATH B. If the value of the counter equals the duration of the timeout period, the method 300 proceeds to step 314 via PATH C.

At step 312, an audible and/or visual alarm is triggered. For example, an audible alarm may be emitted from an earpiece speaker or a ringer. A visual alarm may be displayed on a display, keypad, or LED indicator. The method 300 returns to step 305. At step 314, the telephone system is transitioned into the on-hook condition. The method 300 then ends at step 399.

The method 300 may be implemented using software stored in the memory 224 for execution by the microcontroller 202. Although one or more aspects of the invention are disclosed as being implemented as a microcontroller executing a software program, those skilled in the art will appreciate that the invention may be implemented in hardware, software, or a combination of hardware and software. Such implementations may include a number of processors independently executing various programs and dedicated hardware, such as ASICs.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to illustrative embodiments of the present invention, other and further embodiments of the invention may be devised without departing from the basic scope thereof, and the scope thereof is determined by the claims that follow.

What is claimed is:

1. A telephone system, comprising:
a memory for storing user preference data, including duration of a timeout period;
a counter; and
a microcontroller for initializing the counter in response to an off-hook condition and, if a value of the counter equals the duration of the timeout period before detection of an on-hook condition, transitioning to the on-hook condition.

2. The telephone system of claim 1, further comprising:
an earpiece speaker;
wherein the microcontroller is configured to cause the earpiece speaker to emit an audible alarm if the value of the counter equals a predefined percentage of the duration of the timeout period.

3. The telephone system of claim 1, further comprising:
at least one of a display, a keypad, or a light emitting diode (LED) indicator;
wherein the microcontroller is configured to cause at least one of the display, the keypad, or the LED indicator to display a visual alarm if the value of the counter equals a predefined percentage of the duration of the timeout period.

4. The telephone system of claim 1, further comprising:
a ringer;
wherein the microcontroller is configured to cause the ringer to emit an audible alarm if the value of the counter equals a predefined percentage of the duration of the timeout period.

5. The telephone system of claim 1, further comprising:
an accelerometer for detecting motion of the telephone system;
at least one of a display, a keypad, a light emitting diode (LED) indicator, an earpiece speaker, and a ringer;
wherein the microcontroller is configured to cause at least one of the display, the keypad, the LED indicator, and the earpiece speaker to emit an alarm if the accelerometer fails to detect motion of the telephone system after a predefined time period.

6. The telephone system of claim 1, further comprising:
a microphone;
wherein the microcontroller is configured to cause at least one of the display, the keypad, the LED indicator, and the earpiece speaker to emit an alarm if the microphone fails to detect audio activity above a background noise level after a predefined time period.

7. The telephone system of claim 1, further comprising:
a keypad;
wherein the microcontroller is configured to temporally extend the duration of the timeout period in response to activation of a predefined button on the keypad.

8. The telephone system of claim 1, further comprising:
an accelerometer for detecting motion of the telephone system;
wherein the microcontroller is configured to temporally pause the counter if the accelerometer detects motion of the telephone system and resume the counter or reinitialize the counter if the accelerometer detects that the telephone system is not in motion for a predefined time period.

9. The telephone system of claim 1, further comprising:
a microphone;
wherein the microcontroller is configured to temporally pause the counter if the microphone detects audio activity above a background noise level and resume the counter or reinitialize the counter if the microphone fails to detect audio activity above the background noise level after a predefined time period.

10. The telephone system of claim 1, further comprising:
a passive infrared (PIR) motion detector for detecting motion in an environment;
at least one of a keypad or a display;
wherein the microcontroller is configured to light at least one of the keypad or the display for a predefined time period if the PIR motion detector detects motion in the environment.

11. The telephone system of claim 10, further comprising:
an accelerometer for detecting motion of the telephone system;
wherein the microcontroller is configured to cease lighting at least one of the keypad or the display if the accelerometer detects motion of the telephone system.

12. In a telephone system, a method comprising:
detecting an off-hook condition;
initializing a counter in response to the off-hook condition;
comparing a value of the counter with a duration of a timeout period;
monitoring for an on-hook condition; and
transitioning to the on-hook condition if the value of the counter equals the duration of the timeout period before the on-hook condition is detected.

13. The method of claim 12, further comprising:
causing an earpiece speaker to emit an audible alarm if the value of the counter equals a predefined percentage of the duration of the timeout period.

14. The method of claim 12, further comprising:
causing at least one of a display, a keypad, or a light emitting diode (LED) indicator to display a visual alarm if the value of the counter equals a predefined percentage of the duration of the timeout period.

15. The method of claim 12, further comprising:
causing a ringer to emit an audible alarm if the value of the counter equals a predefined percentage of the duration of the timeout period.

16. The method of claim 12, further comprising:
temporally extending the duration of the timeout period in response to activation of a predefined button on a keypad.

17. The method of claim 12, further comprising:
temporally pausing the counter if an accelerometer detects motion of the telephone system; and
resuming or reinitializing the counter if the accelerometer detects that the telephone system is not in motion for a predefined time period.

18. The method of claim 12, further comprising:
temporally pausing the counter if a microphone detects audio activity above a background noise level; and
resuming or reinitializing the counter if the microphone fails to detect audio activity above the background noise level after a predefined time period.

19. The method of claim 12, further comprising:
lighting at least one of a keypad or a display for a predefined time period if a PIR motion detector detects motion in an environment.

20. The method of claim 19, further comprising:
ceasing lighting at least one of the keypad or the display if an accelerometer detects motion of the telephone system.

21. A computer readable medium having stored thereon instructions that, when executed by a processor, cause the processor to perform a method of a method, comprising:
detecting an off-hook condition;
initializing a counter in response to the off-hook condition;
comparing a value of the counter with a duration of a timeout period;
monitoring for an on-hook condition; and
transitioning to the on-hook condition if the value of the counter equals the duration of the timeout period before the on-hook condition is detected.

22. The computer readable medium of claim 21, further comprising:
causing an earpiece speaker to emit an audible alarm if the value of the counter equals a predefined percentage of the duration of the timeout period.

23. The computer readable medium of claim 21, further comprising:
causing at least one of a display, a keypad, or a light emitting diode (LED) indicator to display a visual alarm if the value of the counter equals a predefined percentage of the duration of the timeout period.

24. The computer readable medium of claim 21, further comprising:
causing a ringer to emit an audible alarm if the value of the counter equals a predefined percentage of the duration of the timeout period.

25. The computer readable medium of claim 21, further comprising:
temporally extending the duration of the timeout period in response to activation of a predefined button on a keypad.

26. The computer readable medium of claim 21, further comprising:
temporally pausing the counter if an accelerometer detects motion of the telephone system; and
resuming or reinitializing the counter if the accelerometer detects that the telephone system is not in motion for a predefined time period.

27. The computer readable medium of claim 21, further comprising:
temporally pausing the counter if a microphone detects audio activity above a background noise level; and
resuming or reinitializing the counter if the microphone fails to detect audio activity above the background noise level after a predefined time period.

28. The computer readable medium of claim 21, further comprising:
lighting at least one of a keypad or a display for a predefined time period if a PIR motion detector detects motion in an environment.

29. The computer readable medium of claim 28, further comprising:
ceasing lighting at least one of the keypad or the display if an accelerometer detects motion of the telephone system.

* * * * *